United States Patent Office

3,514,268
Patented May 26, 1970

3,514,268
NOVEL PROCESS FOR THE MANUFACTURE OF DIMAGNESIUM ALUMINOSILICATE FOR MEDICAL USES
Hidetaka Uoda, Shinminato-shi, Matajiro Osaka, Imizu-gun, Toyama-ken, and Minoru Okuda, Toyama-shi, Japan, assignors to Fuji Kagaku Kogyo Kabushiki Kaisha, Kamiichi-machi, Naka-Niikawa-gun, Toyama-ken, Japan, a company of Japan
No Drawing. Filed Dec. 27, 1966, Ser. No. 604,611
Claims priority, application Japan, Dec. 27, 1965, 40/81,132
Int. Cl. C01g 57/00; C01b 33/28
U.S. Cl. 23—315                                   6 Claims

ABSTRACT OF THE DISCLOSURE

A process for the manufacture of dimagnesium aluminosilicate by reacting 4 mols of caustic soda with an aqueous solution of a water soluble aluminum salt, equivalent to 1 mol of $Al_2O_3$ whereby a dibasic aluminum salt is obtained, reacting the so obtained product sequentially with 1 mol of sodium silicate to obtain tetrabasic dialuminum silicate, then with 4 mols caustic soda to convert the product into the neutral salt, and finally with an aqueous solution of a water soluble magnesium salt equivalent to 2 mols of MgO. The product is used in medicine as an antacid.

The chemical compound is widely used at present as an antacid for treatment of disorders of the digestive tract as an excellent antacid because of its strong neutralizing capacity and buffering effect which is sustained for a long time, since it is not absorbed. Moreover, it does not generate carbon dioxide, avoiding thus the discomfort of belching. It is another advantage that it will not deteriorate when stored for a long time.

According to a known method for the manufacture of dibasic magnesium aluminate magnesium salt equivalent to 1 mol of MgO is reacted with 2 mols of dibasic sodium aluminate obtained by reacting caustic soda with an aqueous solution of aluminum salt, with the resulting compound. 1 mol of sodium silicate is thereafter reacted, according to the equations illustrating the process as follows:

$Al_2(SO_4)_3 + 10NaOH \rightarrow 2Al(OH)(ONa)_2 + 3Na_2SO_4$ $2Al(OH)(ONa)_2 + 2MgCl_2 \rightarrow 2Al(OH)O_2Mg + 4NaCl$

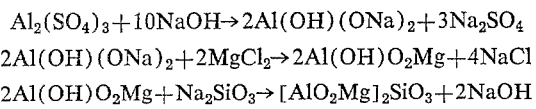

The thus obtained precipitate of the dimagnesium aluminosilicate is washed by decantation to remove the impurities produced as by-product in order to obtain the final product.

However, it is well known that the precipitated dimagnesium aluminosilicate contains the accumulated particles of fine size, and its sedimentation rate is extremely slow; moreover, due to its excellent adsorptive capacity, it holds firmly the by-products, especially caustic soda, and does not release them, so that a huge volume of water, a great deal of labor and a long time are required for the purification of the product, which is a serious bottleneck for its industrial production.

It is, therefore, the object of this invention, to overcome the above mentioned bottleneck and to establish a simple and economical method, of producing dimagnesium aluminosilicate. The novel process for the manufacture, according to the invention is to react 4 mols of caustic soda while stirring with an aqueous solution of water-soluble aluminum salt equivalent to 1 mol of $Al_2O_3$, to this, an aqueous solution of 1 mol of sodium silicate and further an aqueous solution of caustic soda is added so that the sum of $Na_2O$ comes to 5 mols together with the $Na_2O$ content of sodiumsilicate; with the resulting salt, an aqueous solution of water-soluble magnesium salt equivalent to 2 mols of MgO is finally reacted.

In other words, the principle of the method of this invention is that 1 mol of sodium silicate is reacted with dibasic aluminum salt of a mineral acid produced by adding 4 mols of caustic soda to an aqueous solution of water-soluble aluminum salt; e.g. aluminum sulfate, aluminum chloride, etc. equivalent to 1 mol of $Al_2O_3$ to obtain tetrabasic dialuminum silicate. This is converted to neutral sodium salt by reacting with caustic soda and thereafter an aqueous solution of water-soluble magnesium salt; e.g. magnesium chloride, magnesium sulfate, etc. equivalent to 2 mols of HgO is reacted to carry out the reaction by double decomposition. For example, the reaction equations are as follows:

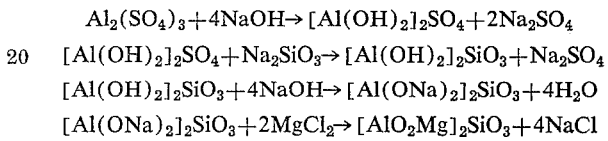

$[Al(OH)_2]_2SiO_3 + 4NaOH \rightarrow [Al(ONa)_2]_2SiO_3 + 4H_2O$ $[Al(ONa)_2]_2SiO_3 + 2MgCl_2 \rightarrow [AlO_2Mg]_2SiO_3 + 4NaCl$ As it is apparent from the above equations, the method of this invention is quite different from the old method in the process of synthesis. In other words, according to the method of this invention aluminate and silicate are combined and thereafter magnesium is reacted, whereas according to the old method aluminate and magnesium are first combined and silicate is then reacted. It is for this reason that the method of this invention has the following advantages in comparison with the old method:

(1) Cutting down costs of materials: According to the old method the amount of caustic soda needed to obtain dimagnesium aluminosilicate from aluminum salt is 10 mols, whereas according to the method of this invention 8 mols are sufficient, which means that the amount of caustic soda standing first in the costs of materials of the compound in caption can be cut down to 20 percent. When compared with the old method. This spelles an important economic advantage.

(2) Shortening the reaction time: The reaction of the old method is a reversible reaction, wherein alkali is always present, and 2 mols of caustic soda formed as by-product during the progress of the reaction must be successively neutralized and washed out to be removed from the reaction process before it is completed. In this way, an extremely long time and much effort are required to complete the reaction; contrary thereto the method of the invention belongs to the reaction of the type of double decomposition of the neutral salts, and since all the components required to the reaction are stoichiometrically employed, the reaction is simple and completed in a short time.

(3) Simplified purification: As described above, the dimagnesium aluminosilicate made in accordance with the invention is a precipitate comprising the accumulation of particles of fine size, its sedimentation rate is very slow and further, due to its strong adsorptive capacity it firmly holds the reaction by-products, especially caustic soda and does not release them easily. As a consequence, according to the old method, wherein caustic soda is produced as by-product, the purification becomes the biggest bottleneck in the production. Contrary, thereto, according to the method of this invention, no caustic soda hard to remove is produced, so that the purification becomes much simpler and the required volume of water, labor and the time spent can be remarkably cut down, which is again reflected in the manufacture costs.

(4) Increase of the yield and the uniform quality: As already described, the old process is carried out in alkaline medium and the caustic soda produced as by-product is successively washed with water to be removed in order that the reaction may progress, while there are large amounts of silicate and aluminum washed away, thereby involving a decrease of the yield as well as the unevenness of the composition. On the other hand, according to the method of this invention the reaction process is carried out in an entirely different way, where there are no components washed away and accordingly the yield is not only improved, but the composition can be kept constant, and thus it becomes very easy to control the quality.

In this way, according to the method of this invention the difficulties existing in the old method are overcome; not only are considerable savings in labor and time achieved, but the material cost is cut down as well, and yet the yield is increased and no variations in the composition of the product are caused. It is for these reasons that the present invention spells a very economical process for the manufacture of dimagnesium aluminosilicate for medical use. The following examples further illustrate the method according to the invention.

EXAMPLE 1

To 297 g. of aluminum sulfate (containing 17.2 percent $Al_2O_3$) dissolved in 900 cc. of water, 550 cc. of caustic soda solution ($Na_2O$ 11.25% v.) are added with vigorous stirring, and a mixed solution comprising 207 cc. of sodium silicate solution ($SiO_2$ 14.5% v., $Na_2O$ 9.2% v., with 94 cc. of caustic soda solution ($Na_2O$ 11.25% v.) is further added dropwise and stirring is continued for two hours. To the resultant mixture, 550 cc. of caustic soda solution of the same density as above are then added, to which 400 cc. of magnesium sulfate solution ($MgSO_4$ 30.13% v.) are added with vigorous stirring, heating and stirring is further continued for five hours while keeping the temperature at 60° C. When the reaction mixture becomes neutral, it is allowed to cool and to stand, and the supernatant fluid is decanted. The precipitate is washed several times with water and filtered. The residue is dried at 70° C., pulverized and there are obtained 181 g. of white powdered dimagnesium aluminosilicate. This product has a composition ratio of MgO to $Al_2O_3$ to $SiO_2$ of 2:1:1, and the loss on ignition is 36.41%. The amount of 0.1 N hydrochloric acid consumed by 1.0 gram of this product dried to constant weight at 105–110° C. comes to 284 cc. and according to Fuch's test made with this product the time to maintain the pH range at 3 to 5 extends over 70 minutes, as shown in the following table; this product is considered excellent.

| Time (min.): | pH value |
| --- | --- |
| 1 | 4.2 |
| 3 | 4.3 |
| 5 | 4.4 |
| 10 | 4.4 |
| 20 | 4.3 |
| 30 | 4.1 |
| 40 | 4.0 |
| 50 | 3.9 |
| 60 | 3.7 |
| 70 | 3.3 |
| 80 | 2.0 |

EXAMPLE 2

In the same manner as Example 1, 297 g. of aluminum sulfate (containing 17.2% $Al_2O_3$), 1,194 cc. of caustic soda solution ($Na_2O$ 11.25% v.) and 207 cc. of sodium silicate solution ($SiO_2$ 14.51%, $Na_2O$ 9.2% v.) are reacted one after another and to the resultant reaction mixture 374 cc. of magnesium chloride solution ($MgCl_2$ 25.51% v.) are added with vigorous stirring, stirring is continued overnight. Thereafter, through the same process as Example 1, 176 g. of dimagnesium aluminosilicate are obtained, whose acid neutralizing capacity is 285 cc. and loss on ignition is 35.56%.

What we claim is:

1. A process for preparing dimagnesium aluminosilicate which comprises the steps of:
    (a) reacting 4 mols of caustic soda with an aqueous solution of a water-soluble aluminum salt equivalent to 1 mol of $Al_2O_3$;
    (b) reacting the reaction product of step (a) with 1 mol of sodium silicate to thereby form tetrabasic aluminum silicate;
    (c) reacting the tetrabasic aluminum silicate from step (b) with 4 mols of caustic soda to form the corresponding neutral salt;
    (d) reacting the neutral salt from step (c) with an aqueous solution of a water-soluble magnesium salt equivalent to 2 mols of MgO to thereby form dimagnesium aluminosilicate.

2. Process according to claim 1 wherein said water-soluble aluminum salt used in step (a) is a member selected from the group consisting of aluminum sulfate and aluminum chloride.

3. Process according to claim 1 wherein said water-soluble magnesium salt used in step (d) is a member selected from the group consisting of magnesium chloride and magnesium sulfate.

4. Process according to claim 1 wherein said water-soluble aluminum salt used in step (a) is aluminum sulfate and said water-soluble salt used in step (d) is magnesium chloride and said steps (a)–(d) are carried out in accordance with the following reaction scheme:

(a) $Al_2(SO_4)_3 + 4NaOH \rightarrow [Al(OH)_2]_2SO_4 + 2Na_2SO_4$ (b) $[Al(OH)_2]_2SO_4 + Na_2SiO_3 \rightarrow$
$[Al(OH)_2]_2SiO_3 + Na_2SO_4$ (c) $[Al(OH)_2]_2SiO_3 + 4NaOH \rightarrow$
$[Al(ONa)_2]_2SiO_3 + 4H_2O$ (d) $[Al(ONa)_2]_2SiO_3 + 2MgCl_2 \rightarrow$
$[AlO_2Mg]_2SiO_3 + 4NaCl$ 5. The process according to claim 1 wherein the product after drying has the formula $[AlO_2Mg]_2SiO_3$.

6. The process according to claim 1 wherein in the product the ratio $MgO:Al_2O_3:SiO_2$ is 2:1:1.

References Cited

UNITED STATES PATENTS 3,032,394  5/1962  Ishino et al. _____ 23—110

FOREIGN PATENTS 614,384  2/1961  Canada.

OSCAR R. VERTIZ, Primary Examiner

H. S. MILLER, Assistant Examiner

U.S. Cl. X.R.

23—113